United States Patent
Tsai et al.

(10) Patent No.: US 8,659,551 B2
(45) Date of Patent: Feb. 25, 2014

(54) ELECTRICAL APPARATUS HAVING A RETRACTABLE POINTING INPUT DEVICE

(75) Inventors: Tsung-Ying Tsai, New Taipei (TW); Chih-Yi Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 149 days.

(21) Appl. No.: 13/457,160

(22) Filed: Apr. 26, 2012

(65) Prior Publication Data

US 2013/0033423 A1 Feb. 7, 2013

(30) Foreign Application Priority Data

Aug. 2, 2011 (TW) .............................. 100127442 A

(51) Int. Cl.
*G06F 3/033* (2013.01)
*G09G 5/08* (2006.01)

(52) U.S. Cl.
USPC .......................................... 345/167; 345/163

(58) Field of Classification Search
USPC .................. 345/167, 163, 168, 169, 156, 157
See application file for complete search history.

(56) References Cited

U.S. PATENT DOCUMENTS

| | | | |
|---|---|---|---|
| 2006/0219776 A1* | 10/2006 | Finn | 235/380 |
| 2009/0091477 A1* | 4/2009 | McCall et al. | 340/990 |
| 2009/0249846 A1* | 10/2009 | Gokcebay | 70/279.1 |
| 2009/0304217 A1* | 12/2009 | Thalheimer et al. | 381/334 |
| 2010/0091442 A1* | 4/2010 | Theobald et al. | 361/679.09 |
| 2012/0030930 A1* | 2/2012 | Theobald et al. | 29/592.1 |

* cited by examiner

*Primary Examiner* — Ricardo L Osorio
(74) *Attorney, Agent, or Firm* — Muncy, Geissler, Olds & Lowe, P.C.

(57) ABSTRACT

An electronic apparatus including a shell, a door plate, a support member, and a pointing input device is disclosed. The shell comprises an aperture; the door plate is connected to the shell, and can be moved to cover the aperture; the support member is positioned inside the shell, and includes a first position and a second position, wherein the distance between the first position and the aperture is larger than the distance between the second position and the aperture; when the aperture is covered by the door plate, the pointing input device is mounted in the first position, and can be moved to the second position when the aperture is not covered by the door plate, such that the pointing input device can extend from the shell.

9 Claims, 6 Drawing Sheets

ELECTRICAL APPARATUS HAVING A RETRACTABLE POINTING INPUT DEVICE

BACKGROUND OF THE INVENTION

1. Field of the Invention

The present invention relates to an electronic apparatus with a pointing input device; more particularly, the present invention relates to an electronic apparatus in which the pointing input device can be hidden in the shell of the electronic apparatus.

2. Description of the Related Art

A mouse with a roller is the most convenient tool for a user to use when operating a computer to browse the internet. With this kind of mouse, the user can just use a finger to roll the roller, allowing the web page to be scrolled easily and conveniently; there is no need to use the mouse to click on the scroll bar to move the web page.

However, if a user uses a notebook without this kind of mouse, or uses a tablet personal computer, then the user will not be able to use the abovementioned convenient method to browse the internet.

Therefore, there is a need to invent a new electronic apparatus to solve the problem and facilitate internet browsing by a user.

SUMMARY OF THE INVENTION

It is an object of the present invention to provide an electronic apparatus with a retractable pointing input device To achieve the abovementioned object, the electronic apparatus of the present invention includes a shell, a door plate, a support member, and a pointing input device. The shell includes an aperture; the door plate is connected to the shell and can be moved relative to the shell to cover the aperture; the support member is positioned inside the shell, and includes a first position and a second position, wherein the distance between the first position and the aperture is larger than that between the second position and the aperture; when the aperture is covered by the door plate, the pointing input device is mounted in the first position, and it can be moved to the second position when the aperture is not covered by the door plate, such that the pointing input device can extend from the shell.

According to the embodiment of the present invention, the support member includes at least one chute, and the at least one chute includes two recesses located at the first position and second position respectively; the pointing input device includes at least one connecting bar connected to the at least one chute, allowing the pointing input device to be fastened to the chute and to move on the chute. When the pointing input device is mounted on the first position or the second position, the two recesses can fasten the connecting bar.

According to the embodiment of the present invention, the electronic apparatus of the present invention further includes a connecting element used for connecting the door plate and the pointing input device, such that the door plate can cause the pointing input device to move via the connecting element when the door plate moves. In the embodiment of the present invention, the connecting element is a spring.

According to the embodiment of the present invention, the pointing input device of the present invention includes a roller and at least one input button.

According to the embodiment of the present invention, the electronic apparatus of the present invention further includes a soft board connected to the pointing input device and used for transmitting the signal generated by the pointing input device.

According to the embodiment of the present invention, the door plate of the present invention comprises a flange provided for a user to move the door plate.

DETAILED DESCRIPTION OF THE PREFERRED EMBODIMENT

The objects, advantages and innovative features of the invention will become more apparent from the following detailed descriptions when taken together with the accompanying drawings.

Figure 1:
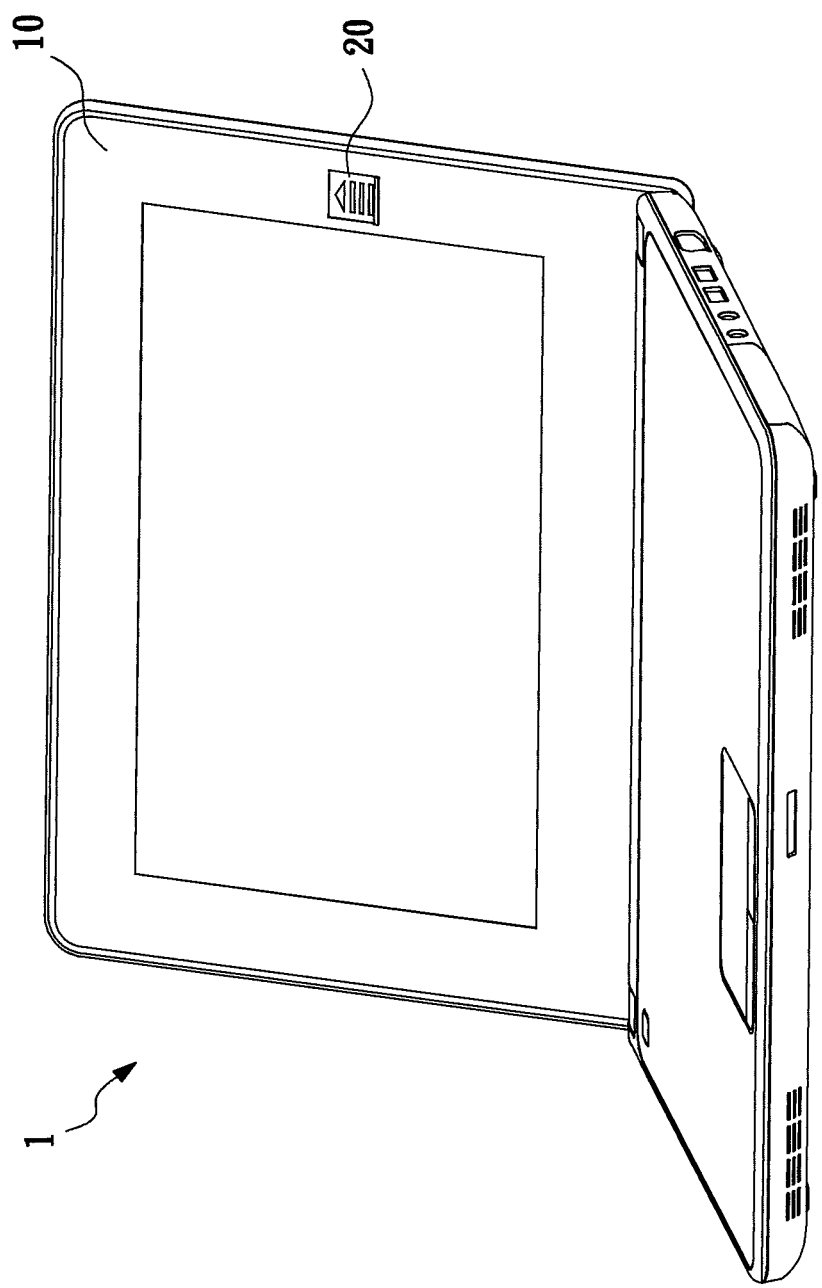
FIG. 1 illustrates a schematic drawing of the electronic apparatus of the present invention when the aperture is not covered by the door plate.
Figure 2:
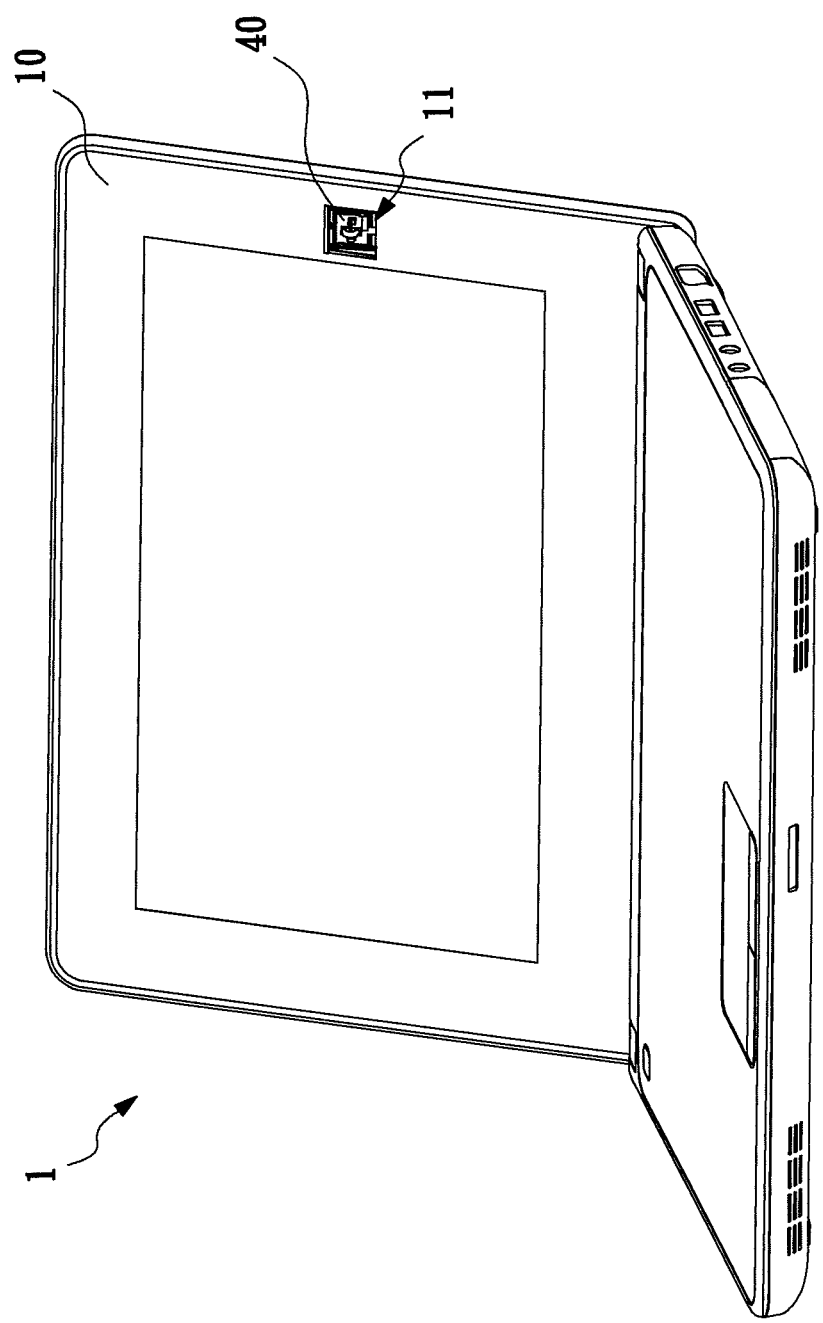
FIG. 2 illustrates a schematic drawing of the electronic apparatus of the present invention when the aperture is covered by the door plate.
Figure 3:
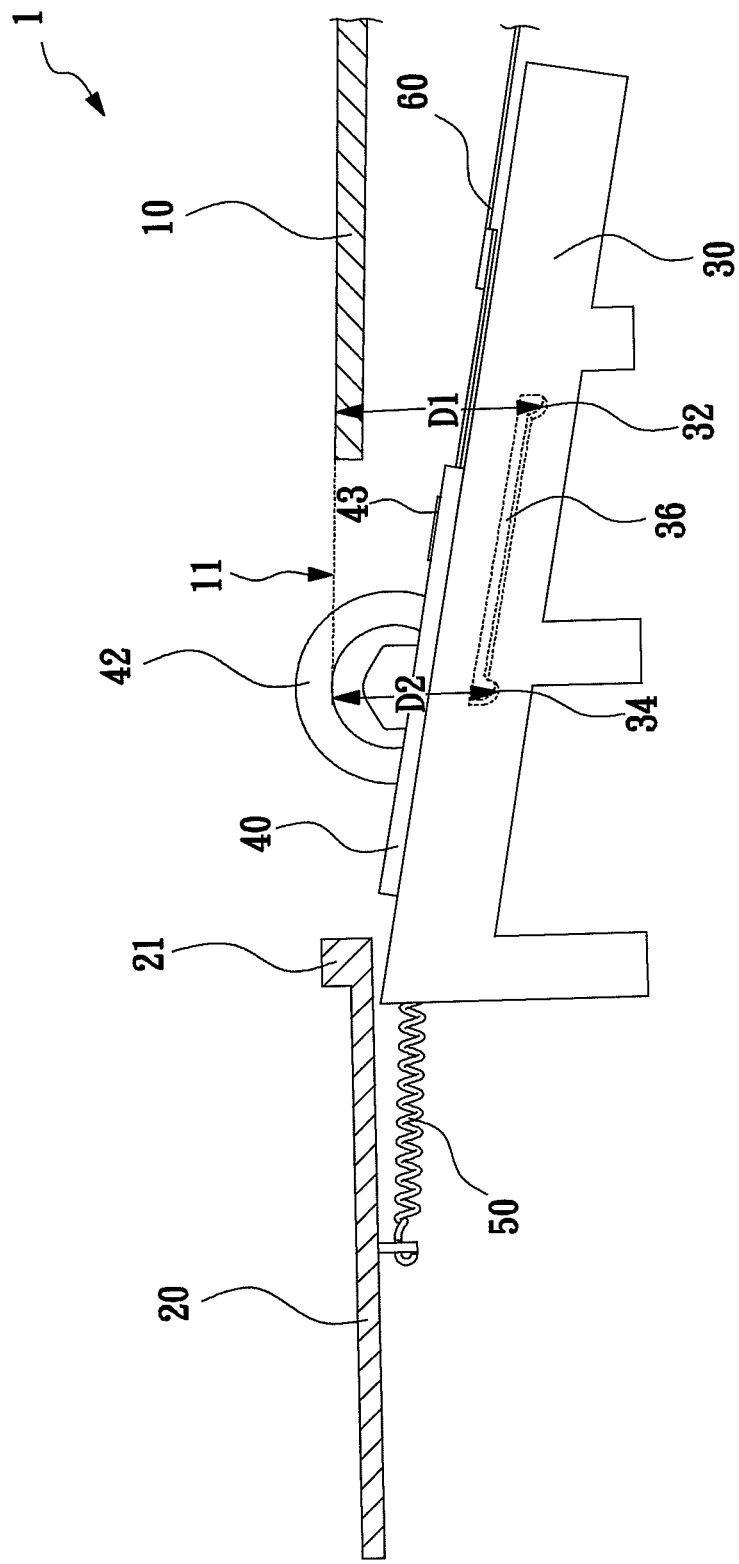
FIG. 3 illustrates a lateral view of the pointing input device of the electronic apparatus of the present invention.
Figure 4:
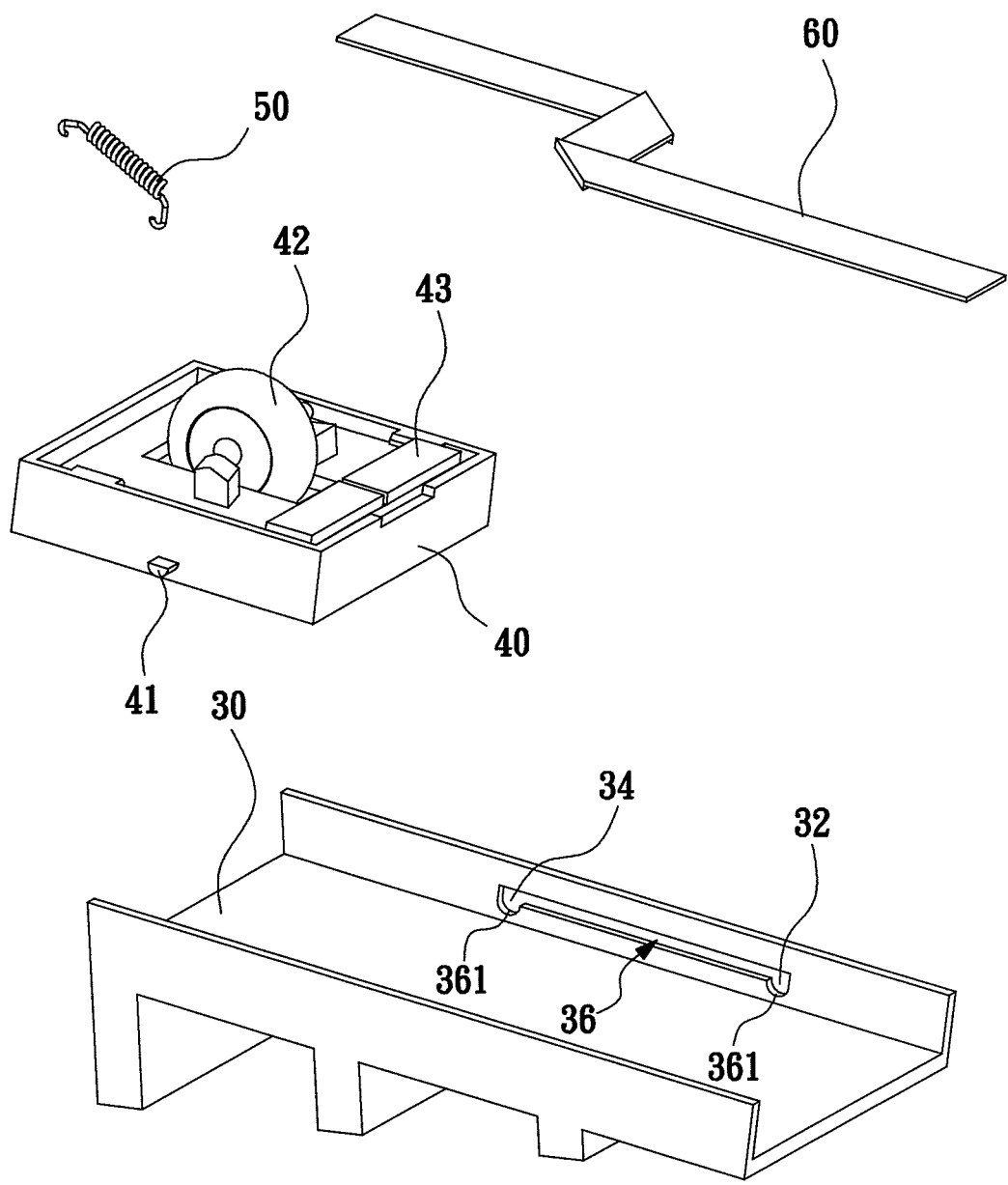
FIG. 4 illustrates an exploded perspective view of the pointing input device of the electronic apparatus of the present invention.

Please refer to FIG. 1 to FIG. 4, which illustrate the electronic apparatus with the retractable pointing input device and the pointing input device of the present invention. FIG. 1 illustrates a schematic drawing of the electronic apparatus of the present invention when the aperture is not covered by the door plate; FIG. 2 illustrates a schematic drawing of the electronic apparatus of the present invention when the aperture is covered by the door plate; FIG. 3 illustrates a lateral view of the pointing input device of the electronic apparatus of the present invention; FIG. 4 illustrates an exploded perspective view of the pointing input device of the electronic apparatus of the present invention.

As shown in FIG. 1 and FIG. 2, the present invention provides an electronic apparatus 1 with a retractable pointing input device. In one embodiment of the present invention, the electronic apparatus 1 of the present invention is a notebook computer, but the present invention is not limited to that application; the electronic apparatus 1 of the present invention can be a tablet personal computer, a smartphone, or other similar electronic apparatus. The electronic apparatus 1 includes a shell 10, an aperture 11, a door plate 20, and a pointing input device 40. The door plate 20 is connected to the shell 10 and can be moved relative to the shell 10 to cover the aperture 11, such that the pointing input device 40 is hidden in the shell 10 (as shown in FIG. 1); alternatively, the door plate 20 can be moved to uncover the aperture 11, such that the pointing input device 40 is revealed outside the shell 10 (as shown in FIG. 2). Therefore, when a user wants to operate the pointing input device 40, the user can move the door plate 20 to reveal the pointing input device 40 outside the shell 10; when a user does not want to operate the pointing input device 40, the user can move the door plate 20 to hide the pointing input device 40 in the shell 10. To be noted is that the position of the aperture 11 of the present invention is not limited to the positions shown in FIG. 1 and FIG. 2, and the position of the shell 10 of the present invention is not limited to the positions shown in FIG. 1 and FIG. 2, either; the position of the shell 10 of the present invention can be anywhere on the electronic apparatus 1, such as in the position where the keyboard is.

Please refer to FIG. 3 and FIG. 4; in one embodiment of the present invention, besides the shell 10, door plate 20, and the pointing input device 40, the electronic apparatus 1 also includes a support member 30, a connecting element 50, and a soft board 60. In one embodiment of the present invention, the door plate 20 includes a flange 21 used for allowing a user to move the door plate 20 easily, such as by using a finger to pull the flange 21 to move the door plate 20. The support member 30 is positioned inside the shell 10 and includes a first position 32 and a second position 34, wherein the vertical distance D1 between the first position 32 and the aperture 11 is larger than the vertical distance D2 between the second position 34 and the aperture 11, which means the direct distance between the first position 32 and the second position 34 is an inclined line. In one embodiment of the present invention, the support element 30 includes at least one chute 36 that comprises two recesses 361 located in the first position 32 and second position 34 respectively (as shown in FIG. 4). When the door plate 20 covers the aperture 11, the pointing input device 40 is located in the first position 32 of the support member 30; when the door plate 20 does not cover on the aperture 11, the pointing input device 40 is moved to the second position 34, such that the pointing input device 40 can extend from the shell 10 through the aperture 11. In one embodiment of the present invention, the pointing input device 40 includes at least one connecting bar 41, a roller 42, and at least one input button 43, wherein the connecting bar 41 is used for connecting to the chute 36, allowing the pointing input device 40 to be fastened to the chute 36 and to move on the chute 36; when the pointing input device 40 is located in the first position 32 or the second position 34, the two recesses 361 of the chute 36 can fasten the connecting bar 41, such that the pointing input device 40 can be fastened in the first position 32 or the second position 34. The roller 42 and the input button 43 are used for allowing the user to input a command, the roller 42 is used for allowing the user to input a roll the command (such as scrolling the web), and the input button 43 is used for allowing the user to input a click command. In one embodiment of the present invention, the amounts of the connecting bar 41 and the chute 36 are two respectively, such that the pointing input device 40 can move more smoothly, but the present invention is not limited to that design. The connecting element 50 is used for connecting to the door plate 20 and the pointing input device 40; therefore, the door plate 20 can cause the pointing input device 40 to move when the door plate 20 moves. In the embodiment of the present invention, the connecting element 50 is a spring, but the present invention is not limited to that application. The soft board 60 is electrically connected to the pointing input device 40 and used for transmitting the signal generated by the user to input commands to the pointing input device 40 via the soft board 60.

It is to be understood that the abovementioned elements and structures are only used for displaying the embodiment of the present invention, and that all changes and combinations of the present invention are not shown in detail. However, those skilled in the art should be able to understand that the abovementioned elements are not all necessary to implement the present invention, and that it is possible to work with other elements of the prior art. For example, if the methods of movement of the door plate 20 and the pointing input device 40 are designed independently, then the connecting element 50 can be removed; or if the pointing input device 40 transmits the signal via a wireless method (such as infrared transmission), then the soft board 60 can be removed.

Figure 5:
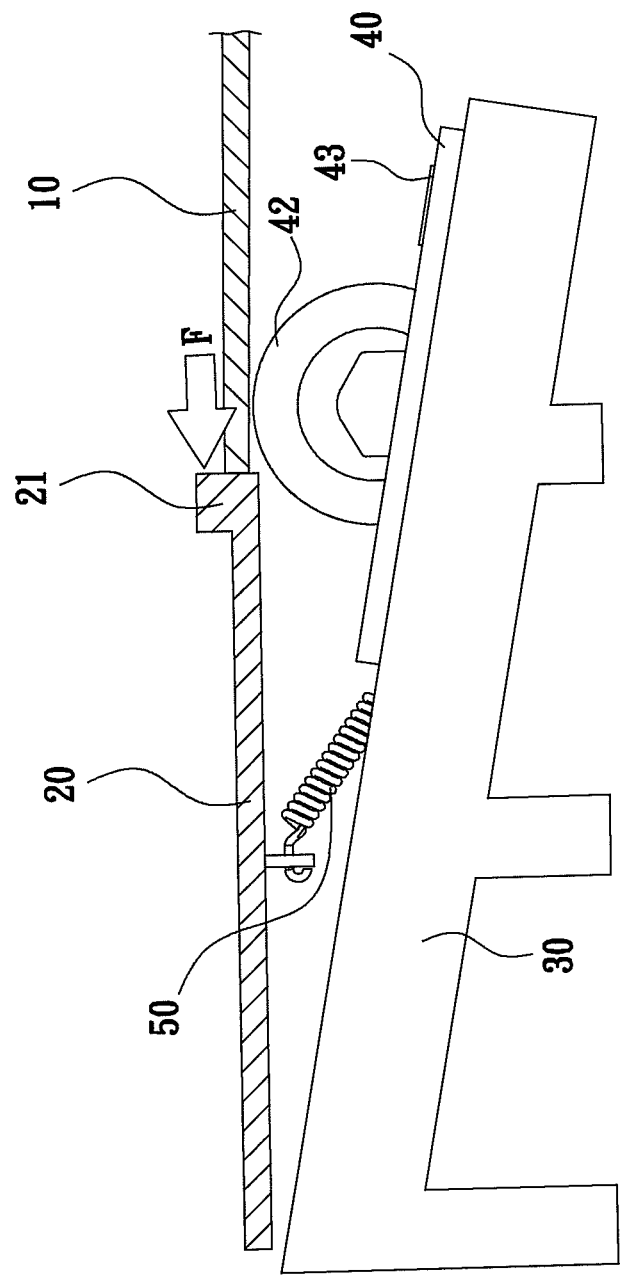
FIG. 5 illustrates a schematic drawing of the pointing input device of the electronic apparatus of the present invention when the pointing input device is hidden in the shell.
Figure 6:
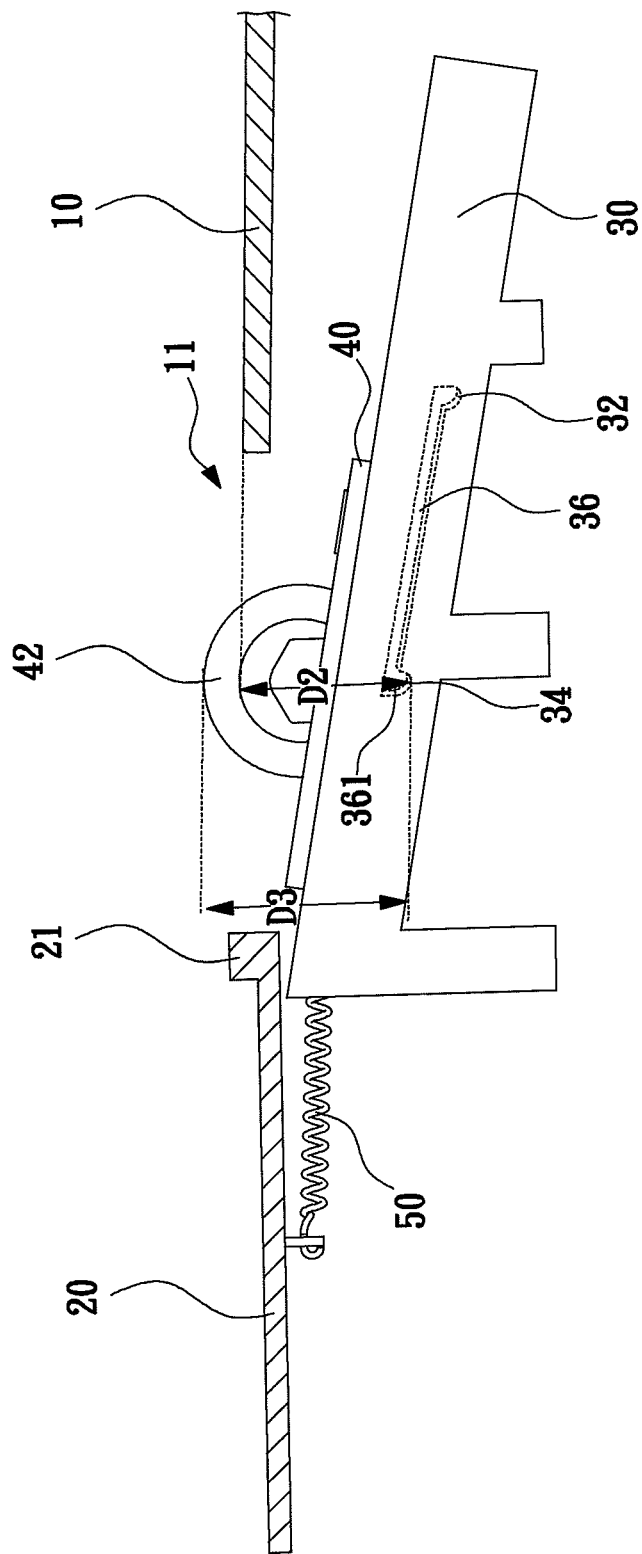
FIG. 6 illustrates a schematic drawing of the pointing input device of the electronic apparatus of the present invention when the pointing input device is stretched out of the shell.

Please refer to FIG. 5 and FIG. 6. FIG. 5 illustrates a schematic drawing of the pointing input device of the electronic apparatus of the present invention when the pointing input device is hidden in the shell. FIG. 6 illustrates a schematic drawing of the pointing input device of the electronic apparatus of the present invention when the pointing input device is extended from the shell.

As shown in FIG. 5, when the door plate 20, which is connected to the shell 10, closes, the pointing input device 40 of the present invention can be hidden in the shell 10, such that the outward appearance of the shell 10 can be integral. If a user wants to use the pointing input device 40, the user just needs to pull the door plate 20 along the direction of the arrow F, and then the pointing input device 40 can be moved to the second position 34 by the connecting element 50, and can be fastened by the recess 361 of the support member 30; meanwhile, the maximum vertical distance D3 between the second position 34 and the pointing input device 40 is larger than the vertical distance D2 between the second position 34 and the aperture 11, allowing part of the pointing input device 40 to extend from the shell 10 (as shown in FIG. 6). To be noted is that it is to be understood that the method of movement of the door plate 20 is not limited to the abovementioned design. For example, if the method of movement of the door plate 20 and the pointing input device 40 are designed independently, the door plate 20 can be designed to be lifted open. Furthermore, the method of fastening of the pointing input device 40 is not limited to using the recess 361 to fasten it; for example, a fastening structure can be formed between the door plate 20 and the shell 10 to achieve the fastening effect.

These and other objects and advantages of the present invention will become apparent from the following description of the accompanying drawings, which disclose several embodiments of the present invention. It is to be understood that the drawings are to be used for purposes of illustration only, and not as a definition of the invention.

What is claimed is:

1. An electronic apparatus with a retractable pointing input device comprising:
   a shell comprising an aperture;
   a door plate connected to the shell, the door plate being movable relative to the shell to cover or not to cover the aperture;
   a support member located inside the shell and the support member comprises a first position and a second position, wherein a vertical distance between the first position and the aperture is larger than that between the second position and the aperture; and
   a pointing input device located in the first position when the door plate covers the aperture; the pointing input device is moved to be located on the second position when the door does not cover the aperture, allowing the pointing input device to extend from the shell via the aperture.

2. The electronic apparatus as claimed in claim 1, wherein the support member comprises at least one chute, the pointing input device comprises at least one connecting bar, and the at least one connecting bar is connected to the at least one chute, allowing the pointing input device to be fastened to the chute and move on the chute.

3. The electronic apparatus as claimed in claim 2, wherein the at least one chute comprises two recesses located in the first position and the second position respectively and the two recesses are used for fastening the at least one connecting bar.

4. The electronic apparatus as claimed in claim 1, wherein the electronic apparatus further comprises a connecting element used for connecting to the door plate and the pointing input device, allowing the door plate to cause the pointing input device to move when the door plate moves.

5. The electronic apparatus as claimed in claim 4, wherein the door plate comprises a flange provided for operating the door plate.

6. The electronic apparatus as claimed in claim 4, wherein the connecting bar is a spring.

7. The electronic apparatus as claimed in claim 1, wherein the pointing input device comprises a roller.

8. The electronic apparatus as claimed in claim 1, wherein the pointing input device comprises at least one input button.

9. The electronic apparatus as claimed in claim 1, further comprising a soft board electrically connected with the pointing input device, allowing a signal generated by the pointing input device to be transmitted by the soft board.

\* \* \* \* \*